L. KAMM.
CINEMATOGRAPH APPARATUS.
APPLICATION FILED MAR. 24, 1914.

1,165,513.

Patented Dec. 28, 1915.
6 SHEETS—SHEET 3.

Inventor:
Leo Kamm,

L. KAMM.
CINEMATOGRAPH APPARATUS.
APPLICATION FILED MAR. 24, 1914.

1,165,513.

Patented Dec. 28, 1915.
6 SHEETS—SHEET 5.

Attest:
Ewd L. Tolson
H. L. Alden

Inventor:
Leo Kamm,
By Spear Middleton Donaldson & Spear
Attys.

L. KAMM.
CINEMATOGRAPH APPARATUS.
APPLICATION FILED MAR. 24, 1914.

1,165,513.

Patented Dec. 28, 1915.
6 SHEETS—SHEET 6.

Attest:
Ewd L. Tolson,
H. L. Alden.

Inventor:
Leo Kamm,
by Spear, Middleton, Donaldson & Spear
Attys.

UNITED STATES PATENT OFFICE.

LEO KAMM, OF LONDON, ENGLAND.

CINEMATOGRAPH APPARATUS.

1,165,513.  Specification of Letters Patent.  Patented Dec. 28, 1915.

Application filed March 24, 1914. Serial No. 826,996.

*To all whom it may concern:*

Be it known that I, LEO KAMM, subject of the King of Great Britain, residing at London, England, have invented certain new and useful Improvements in Cinematograph Apparatus, of which the following is a specification, reference being had therein to the accompanying drawing.

This invention relates to cinematograph apparatus and has for its chief object to keep the film or other picture carrier cool during the working of the apparatus and to enable a film to be conveniently arrested at any moment and held without risk of damage either to the film or to the apparatus and especially without risk of firing the film.

Other objects and features of the invention will appear hereinafter.

The invention comprises a special construction and adaptation of the shutter and shutter mechanism whereby the rotation of the shutter keeps the film sufficiently cool.

It also consists in constructing the cinematograph projector in such a manner that the shutter can be rotated independently of the film driving mechanism.

The invention also comprises means whereby the film can be temporarily stopped at any desired moment.

The invention also comprises means whereby the film driving or the film feeding mechanism is automatically arrested if the film breaks, without however arresting the shutter which continues to rotate and keep the film in the gate cooled if the breakage has occurred below the film gate.

According to said invention I construct the said shutter so that it can also serve as a fan, whereby a current or blast of air is projected on to the film to keep it cool, notwithstanding the great heat to which it is subjected by the rays from the source of light in the projecting lantern.

The shutter driving mechanism is preferably connected to the motor or other driving means directly so as to operate all the time the apparatus is at work and independently of the film driving mechanism. The film driving mechanism however is so connected with its driving means that it can be separately thrown out of operation, or in other words can be disconnected from the drive without any disconnection of the shutter mechanism from the drive, so that the film can be arrested whenever desired and that the combined shutter and fan will at such times go on revolving, the film being kept cool by the air blast projected against it by the fan.

The invention will now be described more fully with reference to an example thereof shown by way of illustration in the accompanying drawings, in which:—

Fig. 12ᵃ comprises two views in planes at right angles to each other of one of the aforesaid runners.

In the said drawings $a$ represents the gate over which the film $b$ passes, $a'$ is the opening in said gate over which the light from the projecting lantern (not shown) is projected, and $c$ the lens through which the light passes from the film to the screen, which parts are of usual construction but possess certain new details hereinafter described.

Figure 2:
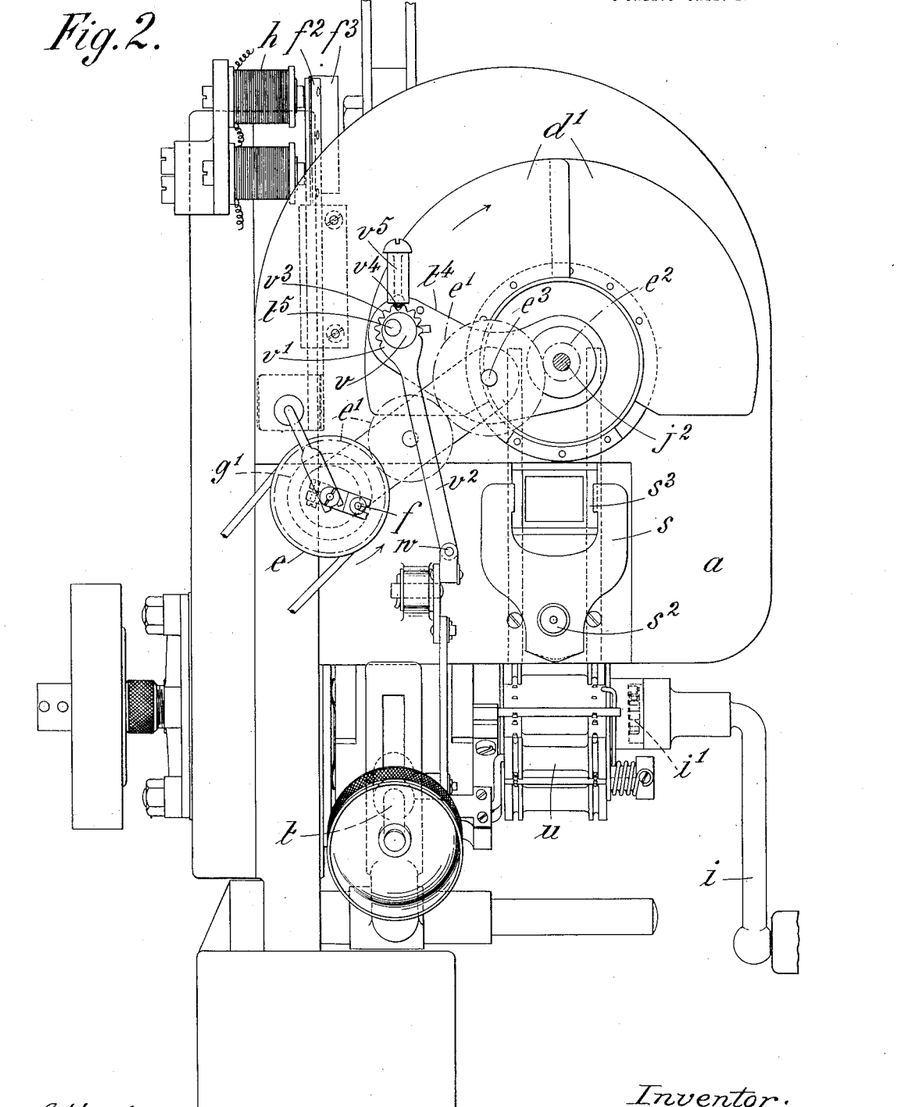
Fig. 2 is a front elevation of the same.
Figures 6, 8:
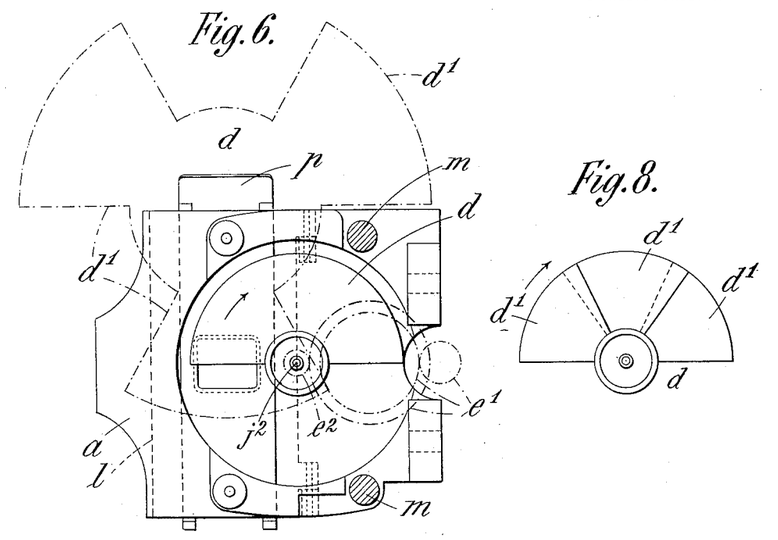
Figs. 6 and 7 are views in planes at right angles to each other showing certain details of the shutter and film mechanisms.
Figs. 8 and 9 are detail views in planes at right angles to each other of the preferred form of shutter.
Figure 7:
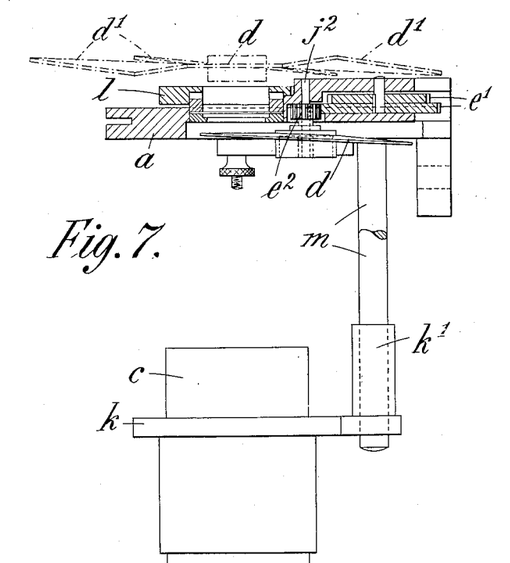
Figure 9:
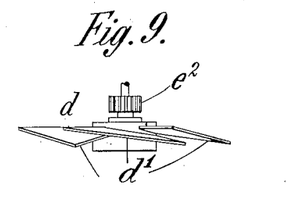

$d$ is the rotary shutter for intercepting the projected light rays when the film $b$ is moved and which is of the semi-disk form. This shutter preferably comprises two or more blades $d'$ $d'$ which preferably overlap as shown in Figs. 2 or 8 but which may instead be spaced apart as shown in dotted lines in Fig. 6. The blades $d'$ are slightly twisted or set at an angle to their axis so as to form a fan so that when rotated in the usual manner in the direction of the arrow it will direct a current or blast of air on to the front surface of the film and so prevent the latter getting detrimentally heated by the projected rays of light from the lantern. Instead of a number of blades I may employ a solid semi-disk, or single segment which semi-disk or segment may be twisted to form a fan. In cases where the rotary shutter is not in the immediate vicinity of the film an additional shutter constructed to act as a fan in the manner above described is employed close to the film. It will be understood that this part of the invention may also be applied or adapted to projectors in which an ordinary shutter is used, by fitting an auxiliary fan of the kind above described immediately adjacent to the film. Such auxiliary fan must be adapted and driven in such a manner that it does not interfere with the action of the ordinary shutter, and it will preferably form in itself an auxiliary shutter and may run synchronously with the ordinary shutter. It will also be understood that an auxiliary fan, or a fan shutter, as described above, may be fitted in front of or behind the film. Where the film gate opens at the back of the film such fan will be fitted in front of the film. Where on the other hand the gate opens at the front of the film, such fan will be fitted at the back of the film. There is a particular advantage with the latter position inasmuch as there will not only be the current of air directed on to the film, but the blades of the fan will themselves cut off an appreciable amount of heat which normally falls upon the film.

The fan shutter is driven from a pulley $e$ which is connected by a belt with the motor, said pulley being geared with the fan shutter by gears $e'$ $e^2$ (one of which may be integral with the pulley) at a sufficiently high speed to keep the film in the gate sufficiently cool. If desired the shutter may be rotated twice or three times the normal speed or even faster, according to the strength of the projecting light, and the amount of cooling necessary.

The shutter driving mechanism and gearing is connected with the film driving gearing by a clutch or other suitable means. In the example illustrated there is employed a clutch, adapted to be disconnected whenever desired so that the film and film driving gearing may come to rest but leaving the shutter rotating and keeping the film cool. The clutch illustrated comprises a spring-returned sliding pin or key $f$ adapted normally to project through a hole $e^x$ in the pulley $e$ and its integral gear $e'$ and lock same with a disk $g'$ fast on the film-driving spindle $g$. Said pin or key is returned into locking position by its spring $f'$ when released or it may be directly returned by hand or by other operating mechanism. The clutch may be disconnected by a lever $f^2$ which may be a hand lever suitably positioned for direct control by the operator, or it may be operated through Bowden wire mechanism or from a distance by the lecturer or other person by electromagnetic means. The latter method is diagrammatically represented in Fig. 14 and is particularly useful for enabling the clutch to be operated from the lecture platform by the lecturer. Such an arrangement as shown comprises an armature $f^3$ pivoted at one end to a fixed point and at its other end to the clutch pin $f$ and adapted to be actuated by an electro-magnet $h$ the coils of which are in a circuit comprising a source of current $h'$ (which is represented as a battery but which may be any convenient source such as the town main) and switches $h^2$ $h^3$ which as shown are connected in parallel, the former being under the control of the lecturer and the latter under the control of the operator so that either of these persons may stop the film whenever desired.

Means are also provided whereby the clutch $f$ is automatically disconnected if the film $b$ breaks. Such means comprises what is herein termed a feeler, namely a device which remains in touch with the surface of the film all the time and is sensitive or responsive to the absence of the film in its immediate vicinity in the event of the film breaking. Such sensitiveness of the feeler may either be electric, affecting the making of a contact, or mechanical involving some slight mechanically transmissible movement of the feeler. In the selected example the feeler is a jockey roller $h^4$ of metal, running on the film and connected in circuit with the clutch mechanism but insulated from the machine frame. The shutter may be driven by hand or by motor.

It will thus be seen that the shutter mechanism is driven directly from a motor but that the film driving mechanism is driven through the clutch connection. On disconnecting the clutch therefore the shutter will spurt forward, and if necessary the speed of the motor and shutter can then be reduced at will. This feature is of particular importance and utility, for it is to be observed that by the arrangement described the film drive is thrown out of operation without first disconnecting the motor or even reducing the current of the latter by resistances or other means. The motor will therefore continue to run at full power notwithstanding that it is relieved of the load of the film drive; consequently its speed will immediately increase very materially and the speed of the fan will similarly increase so that while the film is stationary—which is the dangerous period—there will be projected against it a much greater air blast than is necessary when the film is running.

If necessary a driving handle $i$ can be arranged on the film driving mechanism and this handle can be grasped when the clutch is disconnected to facilitate stopping the film and film driving mechanism. This same handle can also be used independently to drive the machine by hand, the shutter $d$ being then rotated through the clutch connection. On re-connecting the clutch it may be advisable to start the film driving mechanism by hand in order to save the strain or jerk on the clutch by bringing the film-driving member $g'$ up to approximately the speed of the shutter driving member $e$ before the clutch pin $f$ snaps into engagement. The handle $i$ in connection with the film-driving mechanism may be mounted on a ratchet $i'$ or other "free wheel" connection to obviate its revolving while the mechanism is working. This connection will also provide means to move the film feeding mechanism slightly after disengaging the clutch to bring a picture central in the gate, and may also include a back turning brake or its equivalent to assist the stopping of the film-driving mechanism.

Figure 3:
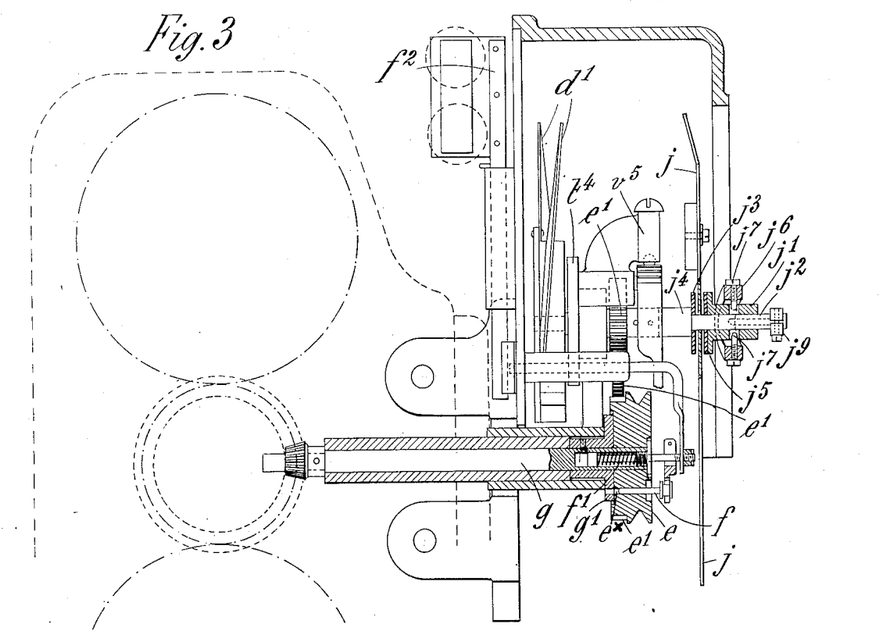
Fig. 3 is a sectional side elevation of the shutter and film driving mechanisms.
Figure 4:
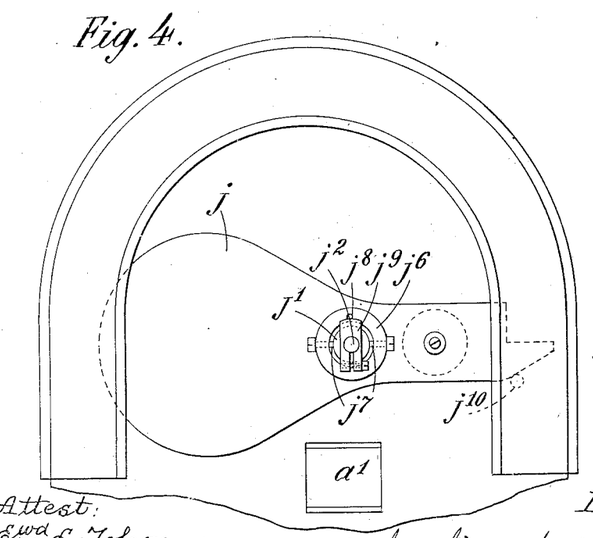
Fig. 4 is a detail showing the safety shutter.
Figure 5:
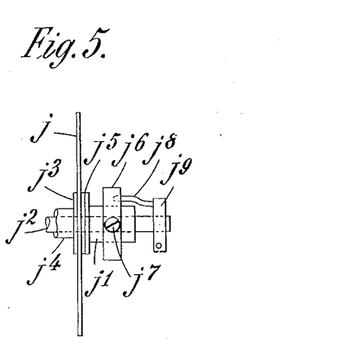
Fig. 5 is a side elevation of a portion of the device shown in Fig. 4.

The usual safety shutter shown at $j$, is adapted in connection with the shutter mechanism; but according to the present invention said shutter $j$ is centrifugally controlled and drops to cut off the light from the film if the shutter should slow down below safety speed. Such centrifugal control in the example selected for illustration comprises a sleeve $j'$ which is keyed on the shutter spindle $j^2$ and is also slidable thereon. Said safety shutter is mounted loosely on the spindle $j^2$ in such a manner as to fall very freely by gravity into its vertical position. On one side of said shutter is a leather or other frictional disk $j^3$ carried by a rotatable but not slidable sleeve $j^4$ which loosely surrounds the spindle $j^2$. On the other side of the shutter there is a leather faced or like frictional clamping disk $j^5$ which is carried by the sleeve $j'$ and normally is out of contact with the shutter $j$. A heavy centrifugal ring $j^6$ loosely surrounds the sleeve $j'$ but in a plane tilted at an angle to the axis of said sleeve; and said ring is pivotally connected with the sleeve $j'$ by trunnions $j^7$ extending from said sleeve at right angles thereto. The ring $j^6$ is held in its tilted position by an arm $j^8$ extending axially from a nut $j^9$ fixed on the outer end of the spindle $j^2$ and bearing against the outer face of the centrifugal ring $j^6$ all as clearly shown in Figs. 3 and 5. The non-slidable sleeve $j^4$ is connected with the shutter driving mechanism so that so long as the shutter is revolving at the requisite speed the centrifugal ring $j^6$ revolving rapidly with the spindle $j^2$ will tend to erect itself thereon, that is to say it will tend to turn about its trunnions $j^7$ into a plane perpendicular to the axis of the spindle $j^2$ with the result that the ring $j^6$ bearing forcibly against the arm $j^8$ will press the sleeve $j^4$ against the safety shutter $j$ which is thereby clamped between the two disks $j^3$ and $j^5$ and consequently revolves with the spindle $j'$. After having turned through a sufficient angle the safety shutter is prevented by a stop $j^{10}$, suitably located, from moving farther, and said shutter accordingly remains stationary in a raised position as shown in Fig. 4.

The shutter mechanism may be connected to picture centering mechanism of any suitable kind such for instance as described in British specification No. 7815 of 1910 whereby the relative position of the shutter is automatically adjusted during any adjustment of the film driving sprocket to center the picture on the screen.

The projector lens carrier, indicated at $k$ (Figs. 10 and 11) is mounted in connection with the door which is necessary for clamping the film and which must open between the film and the projecting lens. As is well known, the film passes between the so-called "gate", which is fixed and the "door" which is movable.

$a$ indicates the gate and $l$ the door. The door $l$ which opens with a parallel action and slides upon the two parallel rods $m \cdot m$ is so constructed so as to take with it the lens carrier $k$ on two tubes $l'$ $l'$ which are mounted with the door $l$. In order to enable the lens to be focused and adjusted as required the lens carrier is mounted on a sleeve $k'$ slidable on one of the tubes $l'$ with means such as a thumb screw $k^2$ for clamping them in adjusted position thereon. By this method it is clearly seen that the necessity for moving the lens relatively to the door when inserting films is obviated, as the lens retains its position relatively with the door whether the latter is open or closed, and need not be re-focused. By the above arrangement also it is possible to bring the lens close to the film for focusing which is necessary in some cases where pictures are projected at a short range and a large image is required.

Figure 10:
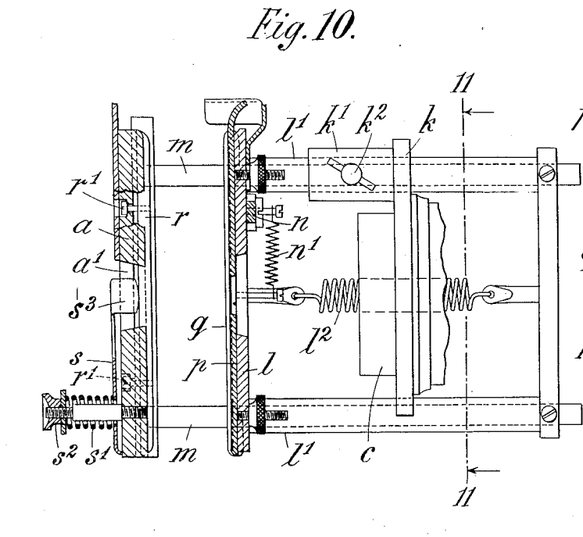
Fig. 10 is a sectional side elevation of the gate opening and closing device.
Figure 11:
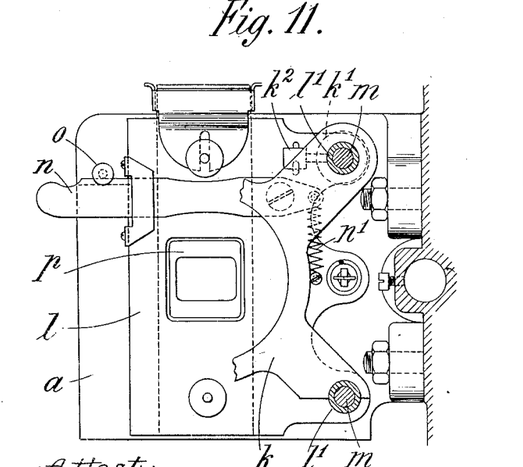
Fig. 11 is a section taken approximately on the line 11—11 of Fig. 10.

In the example shown the door $l$ has attached thereto a tension spring $l^2$ (or springs) the farther end of which is secured to a convenient fixed point in such a manner as to tend constantly to pull the door away from the gate, as shown in Fig. 10, such tendency being resisted while the film is in use by a hand operable latch $n$ on the door which engages a fixed stud $o$ on the gate, said latch being acted upon constantly by a spring $n'$ which keeps it in engagement with said stud.

Figure 12:
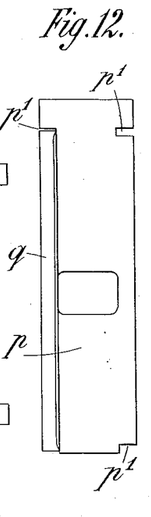
Fig. 12 is a detail of the door plate with one of the runners removed.
Figure 12A:
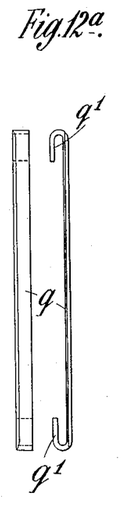

Upon the door $l$, at that part thereof where the film passes over it, is a mask plate $p$ having a new and valuable feature which is shown in detail in Figs. 12 and 12ª. The surface wear upon the mask plate $p$ caused by the rapid passage over its surface of thousands of feet of running film would be very considerable. I therefore arrange that the film shall not touch the mask plate itself, for which purpose I provide runners $q\ q$ at or near the edges of said plate. Such runners however are subjected to very considerable wear and if made a part of the plate would effect no saving as the plate itself would have to be scrapped when the runners were worn. I accordingly make said runners removable, and for this purpose I provide them with means for readily engaging and disengaging the mask plate. Such means in the example shown comprise hooked ends $q'$ which engage in notches $p'$ in the edges of the mask plate $p$. It is only necessary therefore, when the runners $q$ have become worn, to remove them and substitute others, which operation can be performed in a moment.

The gate $a$ is also provided with wear preventing devices which in this instance comprise spring controlled and adjustable "skates" $r\ r$. These skates are at one end loosely connected to the gate $a$ by screws $r'$ allowing them a sufficient backward and forward movement.

Figure 13:
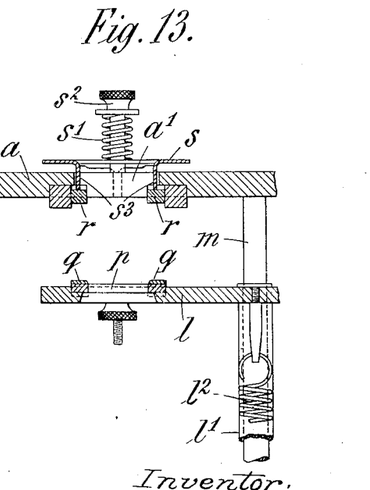
Fig. 13 shows in section certain details of the gate devices.

It is necessary that the skates $r\ r$ should, however adjusted, exert exactly equal pressure upon the film when the door $l$ is closed. I therefore provide a single adjustment device which acts upon them both and which has exactly equal influence upon them both and on the whole of their length. An example of such a device is shown in Figs. 2, 10 and 13 and comprises a spring plate $s$ behind the gate and at its lower end bearing against the latter fulcrum-wise, and a spring $s'$ acting upon said plate with a screw or nut $s^2$ for adjusting the pressure of said spring. The spring plate $s$ has two lugs or the like $s^3$ which extend into the opening $a'$ in the gate and bear centrally against the rear sides of the skates $r\ r$ so that as said plate $s$ is pushed inward or allowed to retire outward by the screw or nut $s^2$ the skates $r$ will correspondingly be pushed outward from or allowed to fall inward toward the gate $a$ and consequently will come into closer or lighter contact with the film, as the case may be.

Figure 1:
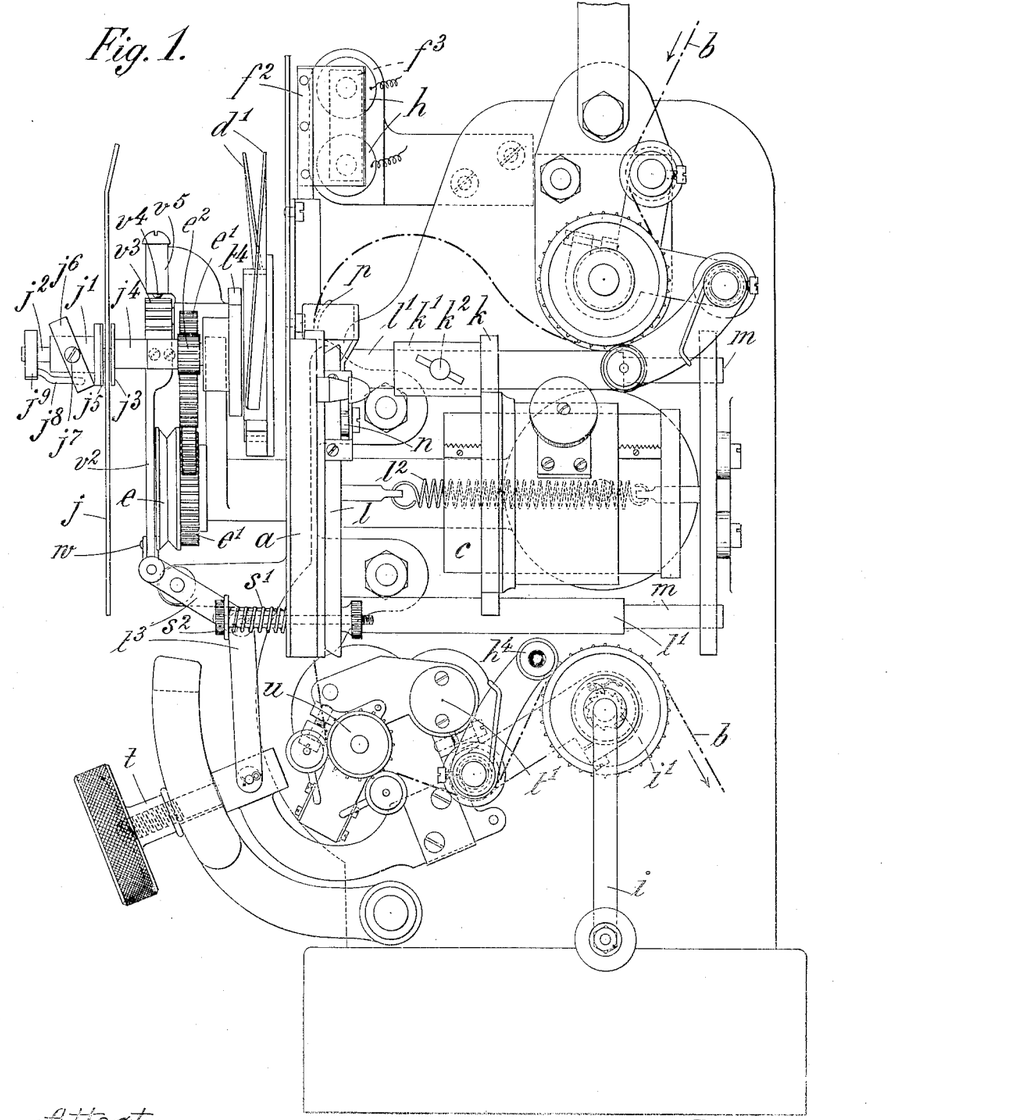
Figure 1 is a sectional side elevation of a cinematograph apparatus embodying the features of the invention.
Figures 14, 15, 16:
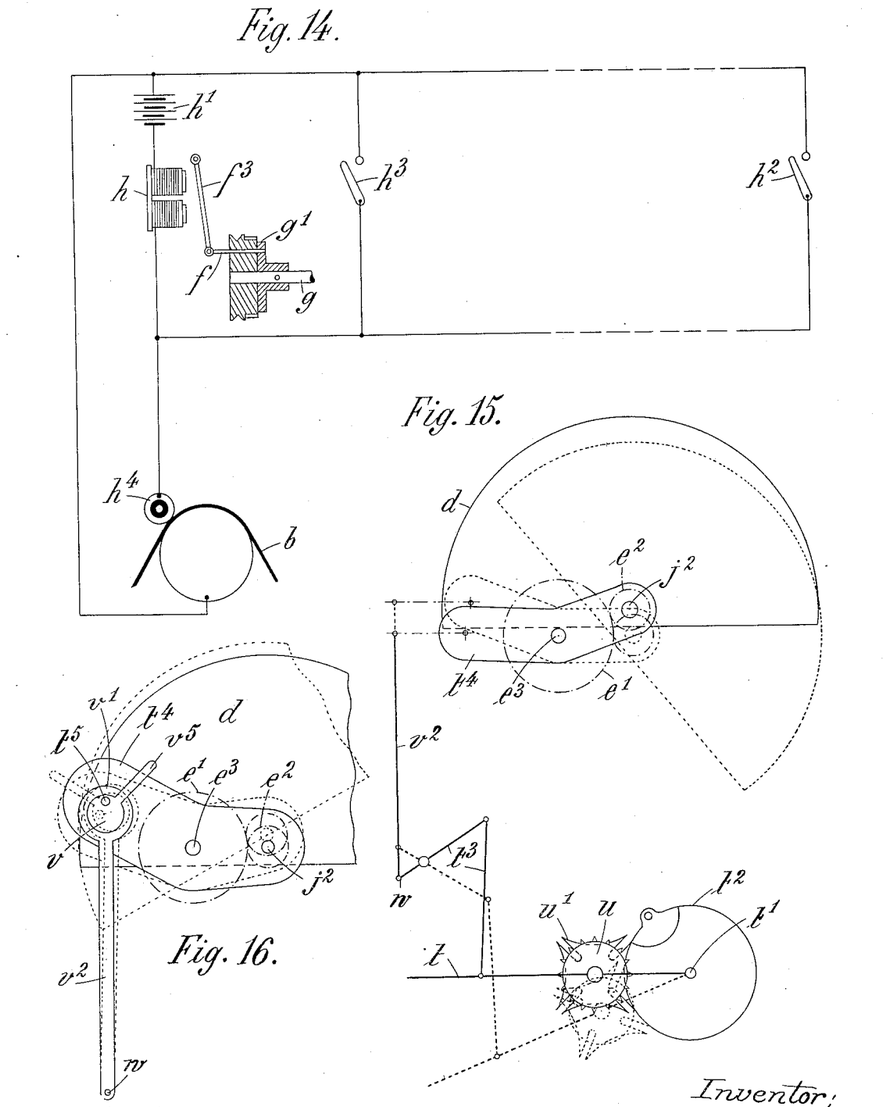
Fig. 14 represents diagrammatically a means for controlling from a distance the clutch-operating mechanism of the film drive.
Fig. 15 represents diagrammatically a mode of adjusting the apparatus for centering the film in the gate.
Fig. 16 shows certain details for the elimination of "ghosts."

Means are provided whereby when the film is shifted in the gate window for the purpose of centering it in said window such act of centering the film will be accompanied by corresponding movement of the whole of the film feeding mechanism and of the shutter carrier about a common center so that these parts may remain in proper mechanical connection with each other. The act of centering will also be accompanied by a momentary acceleration or retardation of the shutter according to whether the centering shift of the film takes place in the direction of the film's run or in the opposite direction. The reason for thus increasing or decreasing the speed of the shutter at such moments is that a momentary increase or decrease in the speed of the film then takes place, and therefore, as the speed of the shutter is nicely proportioned to the speed of the film, the proportion should be maintained even during the period of adjustment, momentary as that period is, otherwise the eyes of the spectators suffer a corresponding disturbance which is quite appreciable and highly unpleasant. Such a device is shown in Figs. 1, 2 and 15, in which $t$ denotes a lever fulcrumed at $t'$ concentric with the disk $t^2$ that operates the Maltese cross $u'$ and carrying the spindle of the film feed roller $u$ and Maltese cross $u'$. At its outer end said lever is connected by a train of connections, including a bell crank $t^3$ and a yoke piece $t^4$, with the shutter spindle $j^2$ in such a manner that when the lever $t$ is moved in one direction or the other the small pinion $e^2$ mounted on said shutter spindle will be carried thereby planet-wise a short distance around its companion gear wheel $e'$ which drives it, such planet movement being made either in the same direction in which the pinion is rotating to accelerate same, or in the opposite direction to retard it. The yoke piece $t^4$ carries the shutter spindle $j^2$ with its pinion $e^2$ and is pivoted about the spindle $e^3$ of that gear wheel $e'$ which meshes with the pinion $e^2$.

For obviating what are known technically as "ghosts" there is provided a device for slightly shifting or adjusting the shutter $d$ so that leakage of light through the gate will be prevented. Such a device in the example shown acts upon a pin $t^5$ at or near the outer end of the yoke piece $t^4$ (that is to say that end thereof which is remote from the spindle $j^2$) and serves to turn said yoke piece slightly in one direction or the other about the spindle $e^3$ so as correspondingly to carry the spindle $j^2$ and pinion $e^2$ a slight distance, planet-wise, about the gear wheel $e'$ on said spindle $e^3$. For this purpose there is interposed between the pin $t^5$ and the outer end of the yoke piece $t^4$ an eccentric $v$ which is rotatable about the pin $t^5$ and has its bearing in the outer end of the yoke piece $t^4$. Surrounding the eccentric $v$ is a strap $v'$ carrying, or as in the illustrated example formed integral with, a connecting rod $v^2$ which is jointed at its farther end to any convenient fixed point $w$. Around the upper arc or crown of the strap $v'$ is a series of ratchet teeth $v^3$ with which engages a spring-pressed pawl or dog $v^4$ slidably carried by a socket $v^5$, which socket is mounted fast with the eccentric. The ratchet teeth $v^3$ are of equal pitch on both sides so that the pawl $v^4$ can ride over them in both directions and will successively snap into engagement with each tooth as it passes over. The socket $v^5$ carrying the pawl $v^4$ serves as a hand lever for adjusting the device and when turned in one direction or the other will correspondingly turn the eccentric $v$, and as the connecting rod $v^2$ is rigid in length it follows that the spindle and with it the outer end of the yoke piece $t^4$ will thus be raised or depressed slightly while the inner end of said yoke piece and with it the shutter spindle $j^2$ will be correspondingly depressed or raised, being carried slightly around the adjacent gear wheel $e^*$ which will slightly turn the pinion $e^2$ and its spindle $j^2$.

What I claim as my invention and desire to secure by Letters Patent is:—

1. In a cinematograph apparatus the combination of a shutter constructed as an air fan or impeller for subjecting the film to an air blast, driving means, means for drivingly connecting said shutter with the driving means, film feeding mechanism, means for driving said film feeding mechanism, and means for disconnecting said film feeding means from its driving means without disengaging the shutter driving connection.

2. In a cinematograph apparatus the combination of a shutter constructed as an air fan or impeller for subjecting the film to an air blast, a motor, means for drivingly connecting said shutter with the motor, film feeding mechanism, means for driving said film feeding mechanism, and means operable from a distance for disconnecting said film feeding means from its driving means without disengaging the shutter driving connection.

3. In a cinematograph apparatus the combination of a shutter constructed as an air fan or impeller for subjecting the film to an air blast, driving means, means for drivingly connecting said shutter with the driving means, film feeding mechanism, means including a clutch for connecting said film feeding mechanism with the drive, electro-magnetic means for throwing out said clutch and means for controlling said electro-magnetic means.

4. In a cinematograph apparatus the combination of a shutter constructed as an air fan or impeller for subjecting the film to an air blast, driving means, means for drivingly connecting said shutter with the driving means, film feeding means, means for connecting said film feeding means with the driving means, means for disengaging such connection, a feeler, and means responsive to that feeler for actuating said disengaging means in the event of the severance of the film.

5. In a cinematograph apparatus the combination of a shutter constructed as an air fan or impeller for subjecting the film to the air blast, driving means, means for drivingly connecting said shutter with the driving means, film feeding means, means including a clutch for drivingly connecting said film feeding means with the shutter mechanism, a feeler and means responsive to said feeler for disengaging said clutch in a predetermined eventuality.

6. In a cinematograph apparatus the combination of a shutter constructed as an air fan or impeller for subjecting the film to an air blast, a spindle, a gear on said spindle gearing with said shutter, film feeding mechanism, driving means therefor on said spindle, and a clutch carried by said spindle and adapted to connect and disconnect the shutter drive and the film feed.

7. In a cinematograph apparatus the combination of a shutter constructed as an air fan or impeller for subjecting the film to an air blast, driving mechanism for said shutter, film feeding means, a motor common to the shutter drive and the film feed, means for regulating said motor, and means independent of the motor regulating means for disconnecting the film feed from the motor and so reducing the load of the motor but without disconnecting the shutter drive and without reducing the power of the motor.

8. In a cinematograph apparatus the combination of a shutter constructed as an air fan or impeller for subjecting the film to an air blast, a power motor, means for drivingly connecting said shutter with the power motor, film feeding mechanism, means for drivingly connecting the film feed with the power motor, means for disengaging said connection of the film feed, and hand operable means independent of the motor drive for driving said film feeding means.

In testimony whereof I have affixed my signature in presence of two witnesses.

LEO KAMM.

Witnesses:
 ALBERT MOND,
 H. D. JAMESON.